(12) United States Patent
Rosenthal et al.

(10) Patent No.: US 11,066,576 B2
(45) Date of Patent: Jul. 20, 2021

(54) DRYWALL JOINT TAPE WITH DUAL PURPOSE ADHESIVE BACKING

(71) Applicant: United States Gypsum Company, Chicago, IL (US)

(72) Inventors: Guy Rosenthal, Wheaton, IL (US); Pamela L. Hargrove, Cary, IL (US); Joseph Adcock, Palos Park, IL (US); Robert Negri, Lake Villa, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 168 days.

(21) Appl. No.: 15/270,123

(22) Filed: Sep. 20, 2016

(65) Prior Publication Data

US 2017/0081562 A1 Mar. 23, 2017

Related U.S. Application Data

(60) Provisional application No. 62/221,282, filed on Sep. 21, 2015.

(51) Int. Cl.
*E04F 13/04* (2006.01)
*C09J 7/21* (2018.01)
(Continued)

(52) U.S. Cl.
CPC . *C09J 5/04* (2013.01); *C09J 7/21* (2018.01); *C09J 7/30* (2018.01); *C09J 7/32* (2018.01);
(Continued)

(58) Field of Classification Search
CPC ........ E04F 13/042; E04F 19/00; E04F 19/02; E04F 19/022; E04F 19/06; B29C 66/1122; C09J 7/32; C09J 2201/614
See application file for complete search history.

(56) References Cited

U.S. PATENT DOCUMENTS

| 1,799,797 A | * | 4/1931 | Huempfner | ................ C09J 7/32 442/149 |
| 4,789,413 A | * | 12/1988 | Tani | .......................... C09J 7/21 156/77 |

(Continued)

FOREIGN PATENT DOCUMENTS

| EP | 0297451 | | 1/1989 | |
| EP | 0297451 A1 | * | 1/1989 | ......... C08G 73/0233 |

(Continued)

OTHER PUBLICATIONS

"Wet-N-Stick Water Activated Joint Tape," product web page, URL grabberman.com/ItemDetails.aspx?itemid=GWNS125, pp. 1-2, published 2016, retrieved from the Internet Sep. 19, 2016.

(Continued)

*Primary Examiner* — Scott R. Walshon
(74) *Attorney, Agent, or Firm* — Greer, Burns & Crain, Ltd.; Philip T. Petti; Pradlp Sahu

(57) ABSTRACT

A joint tape to be applied to wallboard is provided and includes a base substrate having opposing sides. In certain embodiments, a first adhesive layer is applied to one of the sides of the base substrate and a second adhesive layer is applied to the first adhesive layer, where the first adhesive layer is different than the second adhesive layer. In certain other embodiments, two different adhesives are used in a single adhesive layer. In use, the joint tape is positioned over and removably secured to a joint or corner between adjacent wallboard panels using the first adhesive layer. After the joint tape is in position, joint compound is applied to the joint tape, and the water in the joint tape activates it to form a secure bond with the wallboard panels.

5 Claims, 5 Drawing Sheets

(51) Int. Cl.
  *C09J 7/38* (2018.01)
  *E04F 19/02* (2006.01)
  *C09J 5/04* (2006.01)
  *C09J 7/32* (2018.01)
  *C09J 7/30* (2018.01)

(52) U.S. Cl.
  CPC ............... *C09J 7/38* (2018.01); *C09J 7/385* (2018.01); *E04F 13/042* (2013.01); *E04F 19/022* (2013.01); *C09J 2301/204* (2020.08); *C09J 2301/208* (2020.08); *C09J 2301/302* (2020.08); *C09J 2301/306* (2020.08); *C09J 2400/283* (2013.01); *C09J 2401/006* (2013.01)

(56) References Cited

U.S. PATENT DOCUMENTS

| | | | |
|---|---|---|---|
| 9,359,720 B2* | 6/2016 | Chuda | ............... D06N 7/0002 |
| 9,377,160 B1 | 6/2016 | Smythe et al. | |
| 9,388,582 B1 | 7/2016 | Smythe | |
| 2003/0181114 A1 | 9/2003 | Newton et al. | |
| 2004/0170792 A1 | 9/2004 | Roberts | |
| 2006/0254170 A1 | 11/2006 | Goldman | |
| 2008/0128070 A1 | 6/2008 | Goldman | |
| 2008/0139064 A1* | 6/2008 | Neill | ............... C09J 7/21 442/149 |
| 2008/0256886 A1 | 10/2008 | Goldman | |
| 2009/0044395 A1 | 2/2009 | Goldman | |
| 2010/0092725 A1 | 4/2010 | Goldman | |
| 2010/0304114 A1 | 12/2010 | Stevens | |
| 2012/0329627 A1 | 12/2012 | Pettersson | |
| 2015/0114545 A1 | 4/2015 | Chuda et al. | |

FOREIGN PATENT DOCUMENTS

| | | | | |
|---|---|---|---|---|
| EP | 2636713 A1 | 9/2013 | | |
| EP | 2937394 A1 | 10/2015 | | |
| WO | 2004099529 A1 | 11/2004 | | |
| WO | 2008073206 A1 | 6/2008 | | |
| WO | WO-2013182783 A1 * | 12/2013 | ........... | D06N 7/0002 |
| WO | 2014098109 A1 | 6/2014 | | |

OTHER PUBLICATIONS

Preliminary Office Action from Brazilian Patent Application No. BR112018003506-8, dated Jan. 6, 2020.
Office Action from Chinese Patent Application No. 201680051397.4, dated Apr. 17, 2020 (5 pages).
Search Report from Chinese Patent Application No. 201680051397.4, dated Apr. 10, 2020 (2 pages).
Yukun, English Translation of Pressure Sensitive Adhesive Product Technical Manual, Chemical Industry Press, 1st Edition, p. 113, Sep. 2004 (2 pages).
Examination Report from Indian Patent Application No. 201817011415 dated Sep. 21, 2020 (6 pages).
Office Action from CN Patent Application No. 201680051397.4 dated Oct. 27, 2020 (5 pages).
Blue Sky Textures, "How to Prevent Bubbles in Drywall Mud," https://popcornremoval.com/how-to-prevent-bubbles-in-drywall-mud/, dated Jun. 20, 2019 (9 pages).
Carter, "Keys to solving the dilemmas of drywall," Chicago Tribune, dated Nov. 16, 2001 (2 pages).

* cited by examiner

DRYWALL JOINT TAPE WITH DUAL PURPOSE ADHESIVE BACKING

BACKGROUND

The present invention relates to a wallboard joint tape, and more specifically, to a wallboard joint tape having an adhesive backing that enables the tape to be easily applied to joints between adjacent wallboard panels and form a bond with the wallboard panels that strengthens over time after joint compound is applied to the tape.

The joints between adjacent wallboard panels are commonly covered with joint compound to ensure that the joints are not visible after installation, thereby enhancing the appearance of the resulting walls. Joint compound is available in various forms, including a ready-mixed form that is pre-mixed and can be immediately applied to a surface, and in a powder form that must be mixed with water prior to application. In either case, joint compound is initially applied to a joint, and then a paper tape with no adhesive backing is placed onto the joint. The paper tape is then finished with another layer of joint compound to cover the paper. Thus embedded between two layers of joint compound, the paper tape serves to reinforce the joint and prevent the joint compound from cracking during settling or minor movement of the structure. Because the paper tape lacks any type of adhesive, the joint compound secures the tape to the joint. After application, joint compound promptly begins to dry or set. Therefore, it is important to place the joint tape onto the joint compound in the joint as soon as possible to provide proper positioning of the joint tape over the joint. This process can result in significant waste of material and time if sufficient skill is not used to apply the joint tape to the joint.

Another option for finishing a joint between adjacent wallboard panels is fiberglass woven joint tape that includes an adhesive backing. The fiberglass joint tape is placed over a joint between adjacent wallboard panels so that a portion of the joint tape extends onto a portion of each of the adjacent wallboard panels. The joint tape is pressed onto the wallboard panels to cause the adhesive to engage the wallboard panels and secure the joint tape to the panels. After the joint tape is secured over the joint, one or more layers of joint compound are applied over the joint tape to cover the tape and finish the joint. Because the fiberglass tape has an open weave, the layer of joint compound comes in contact with the wallboard surface and bonds to it as it dries, surrounding the fiberglass mesh. Over time, however, the joint compound covering the fiberglass tape can crack due to small movements in the framing from humidity changes and foundation settling. Such cracking occurs in some cases because the fiberglass joint tape fibers are not oriented relative to the wallboard panels to absorb the forces generated by the shifts and movements of the panels over time.

Accordingly, a wallboard joint tape that is easily and securely applied to wallboard joints and that forms a strong bond with wallboard to enhance the durability and appearance of finished wallboard joints over time would be beneficial.

SUMMARY

Embodiments of the present joint tape includes a base substrate having at least two adhesives either mixed together in one adhesive layer or disposed as two separate adhesive layers. The adhesives enable the joint tape to be initially positioned and retained over a joint or corner between adjacent wallboard panels, and then securely bonded to the wallboard panels after activation. Remarkably, due to the porous and absorbent nature of the paper, water that is present in ready-mixed joint compound applied to the top surface of the tape soaks through activates the water-activated adhesive on the bottom side of the tape, resulting in an extremely strong bond of the tape to the wallboard surface once the joint compound is dry.

In an embodiment, a joint tape to be applied to wallboard is provided and includes a base substrate having opposing sides and a single adhesive layer applied to one of the sides of the base substrate. The adhesive layer is formed by a mixture of at least two adhesives in which the adhesive layer is tacky at first and then is further activated by water to more securely adhere the joint tape to wallboard.

In another embodiment, a joint tape to be applied to wallboard is provided and includes a base substrate having opposing sides. A first adhesive layer is applied to one of the sides of the base substrate, and a second adhesive layer is applied to the first adhesive layer, where the adhesive in the first layer is different than the adhesive in the second layer. In use, the joint tape is positioned over and removably secured to a joint or corner between adjacent wallboard panels using the first adhesive layer. After the joint tape is in position, joint compound is applied to the joint tape, and the water from the joint compound penetrates the joint tape to activate the second adhesive to form a secure bond with the wallboard panels.

In a further embodiment, a joint tape to be applied to wallboard is provided and includes a paper substrate having a front side and a rear side. A first adhesive layer is applied to the rear side of the base substrate, and a second adhesive layer that is discontinuous is applied to the first adhesive layer, where the adhesive in the first layer is different than the adhesive in the second layer. In this embodiment, the second adhesive layer forms a relatively weak bond with the wallboard panels to enable the joint tape to be properly positioned and retained over the joint or corner formed between adjacent wallboard panels. The first adhesive is then activated by the water in the joint compound applied to the joint tape to form a secure bond with the wallboard panels.

DETAILED DESCRIPTION

Figure 1A:
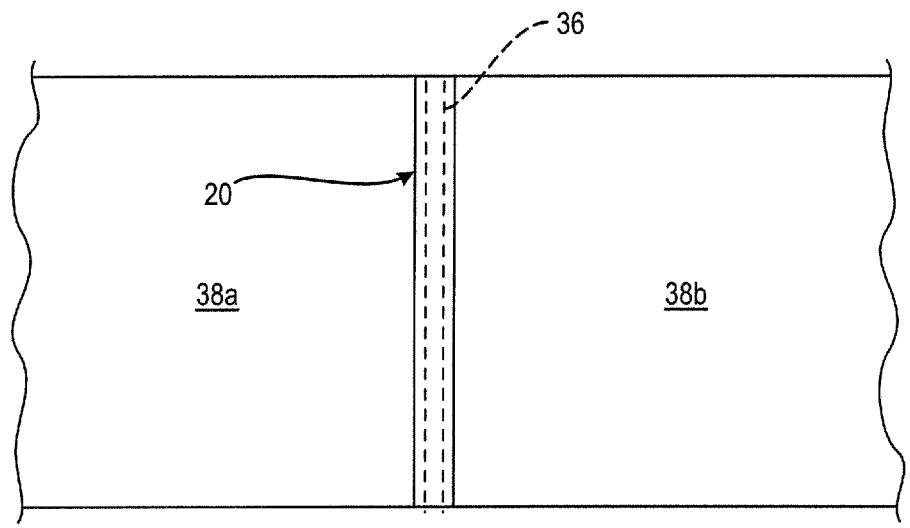
FIG. 1A is a fragmentary elevational view of an embodiment of the present joint tape secured over a joint between adjacent wallboard panels.

The present joint tape includes adhesive layers that enable the tape to be easily applied to and secured over a joint between adjacent wallboard panels and form a bond with the wallboard panels that strengthens over time after application of joint compound on the joint tape.

Referring now to FIGS. 1A, 1B and 2-5, embodiments of the present joint tape generally designated as reference number 20, includes a base substrate 22 made of a wood-based or cellulose material that is formed into an elongated strip having a designated length and width. In an embodiment, the base substrate 22 is made of paper. In an embodiment, the width of the joint tape is 1.75 to 2.5 inches and the thickness of the joint tape is 0.007 to 0.012 inches. It should be appreciated that the joint tape 20, and more specifically, the base substrate 22 may be any suitable width and have any suitable thickness. Also, the base substrate 22 may be made into various different lengths and widths to cover different sized joints formed between adjacent wallboard panels. In another embodiment, the base substrate is made of a synthetic material, such as a material including at least one of polyester fibers, glass fibers and polymer fibers. The base substrate 22 may be made using either woven or non-woven materials. It should further be appreciated that the base substrate 22 may be made with any suitable material or combination of materials. Furthermore, the material used for the base substrate 22 should resist stretching in a dry state, and resist swelling in a wet state. In one embodiment, the base substrate 22 has a crosswise percent elongation when exposed to water, and tested by the American Society for Testing and Materials C474 (ASTM C474), of less than 1.3%, and a lengthwise percent elongation of less than 0.2%. In the illustrated embodiment, the base substrate 22 includes a first side or front side 24, and an opposing second side or rear side 26 where the first side and the second side are substantially flat.

Figure 1B:
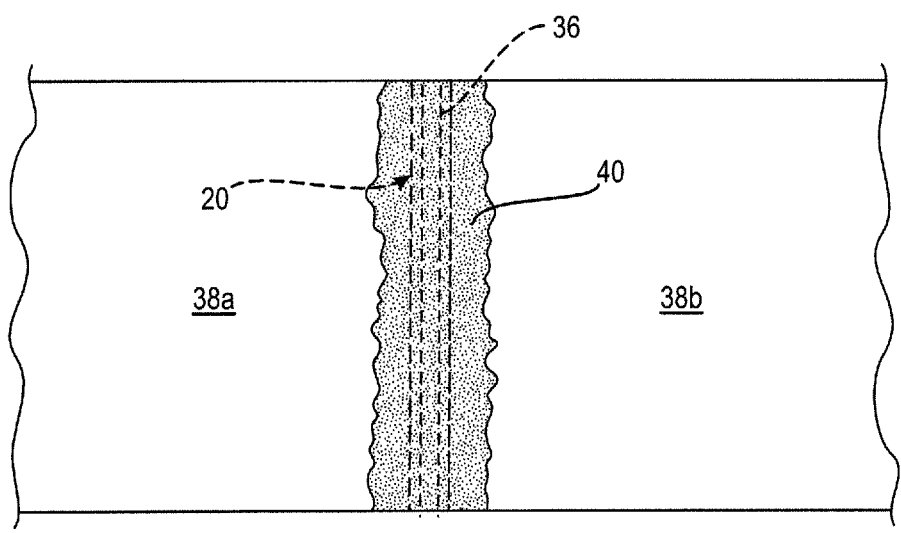
FIG. 1B is a fragmentary elevational view of an embodiment of the present joint tape secured over a joint between adjacent wallboard panels where the joint tape is covered by joint compound.
Figure 2:
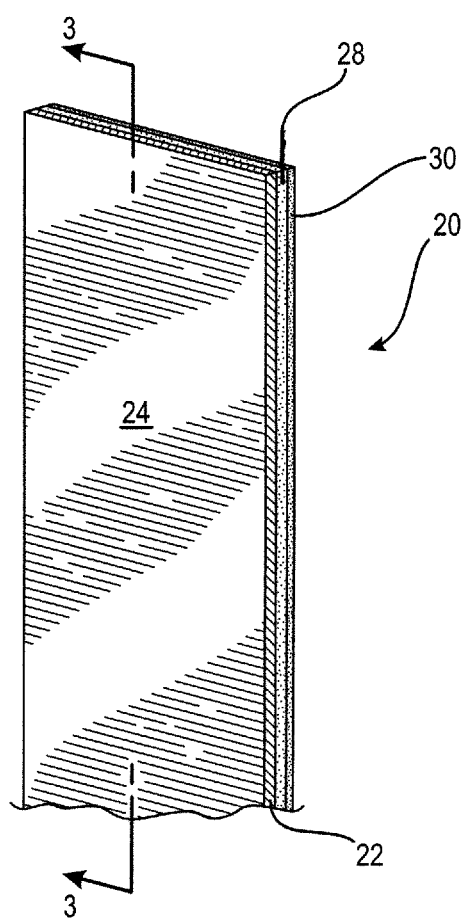
FIG. 2 is a fragmentary perspective view of the joint tape of FIG. 1A.
Figure 3:
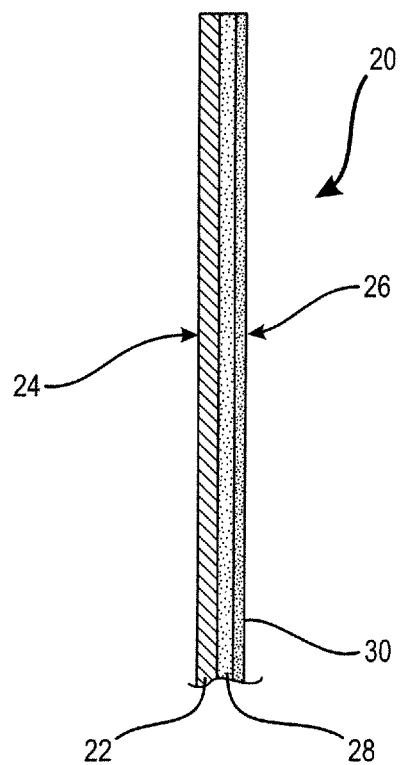
FIG. 3 is a fragmentary cross-sectional view of the joint tape of FIG. 2 taken substantially along line 3-3 and in the direction generally indicated.

As shown in FIGS. 1A, 1B and 2, the first side 24 of the base substrate 22 has a generally smooth surface and faces outwardly when the joint tape 20 is applied to a joint or joints formed between adjacent wallboard panels. In preferred embodiments, a first, wettable adhesive layer 28, similar to the adhesive used to seal envelopes, i.e., an envelope adhesive, is applied directly to the second side 26 of the base substrate 22. The adhesive may be Aquence 2018, manufactured by Henkel Adhesives, Bridgewater, N.J., or any suitable adhesive. Preferably, the wettable adhesive layer 28 is applied to the entire surface of the second side 26 of the base substrate 22. It should be appreciated that the wettable adhesive layer 28 may be applied to a portion or portions of the surface, or the entire surface of the second side 26 of the base substrate 22. In use, the wettable adhesive layer 28 is activated when the adhesive receives moisture or water from either the application of water directly to the adhesive before attaching the tape to a substrate, or by receiving water that is in a joint compound or similar finishing coating applied onto the joint tape after being attached to the substrate.

Figure 4:
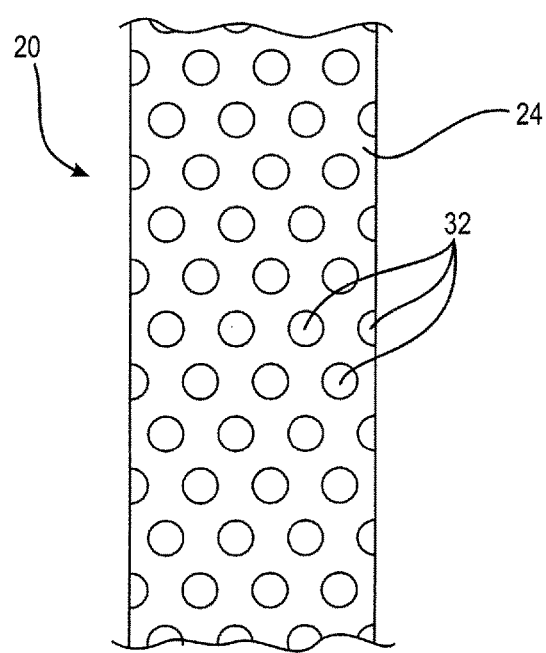
FIG. 4 is a fragmentary elevational view of another embodiment of the present joint tape, where the second adhesive layer is applied to the first adhesive layer in a pattern including a plurality of circles.
Figure 5:
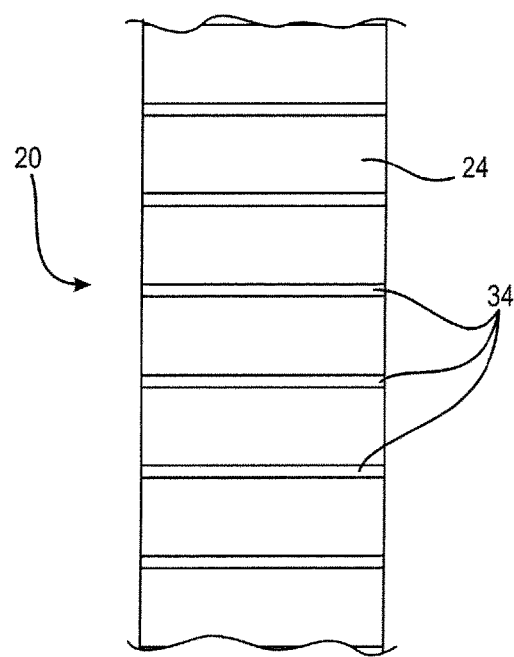
FIG. 5 is a fragmentary elevational view of a further embodiment of the present joint tape, where the second adhesive layer is applied to the first adhesive layer in a pattern including a plurality of lines extending across a width of the joint tape.

After the wettable adhesive layer 28 is coated on or applied to the second side 26 of the base substrate 22 during the manufacturing process, a second adhesive layer 30 is applied to the wettable adhesive layer 28 in certain embodiments. The second adhesive forming the second adhesive layer 30 may be Aquence 8403, which is a water-based acrylic pressure sensitive adhesive, manufactured by Henkel Adhesives, Bridgewater, N.J. Alternatively, the second adhesive may be Technomelt PS 9625 manufactured by Henkel Adhesives, Bridgewater, N.J. It should be appreciated that the second adhesive may be any suitable adhesive or combination of adhesives. In certain preferred embodiments, the second adhesive layer 30 does not cover the entire surface of the wettable adhesive layer 28. Instead, the second adhesive layer 30 is coated on or applied to the first adhesive layer 28 in a pattern such as in a plurality of spaced circles 32 as shown in FIG. 4, or in a plurality of horizontal lines 34 extending across the width of the rear side 26 as shown in FIG. 5. It should be appreciated that the second adhesive layer 30 may be applied to the first adhesive layer 28 in any suitable pattern or patterns, and it may also cover a portion of the first adhesive layer 28 or the entire first adhesive layer 28. It should also be appreciated that the first adhesive layer 28 and the second adhesive layer 30 may include any suitable adhesive or combination of adhesives, as long as the second adhesive layer has reduced adhesion compared to the first adhesive layer. In the illustrated embodiment, the first adhesive layer 28 includes an adhesive that forms a stronger bond with the wallboard panels that is stronger than the bond formed between the adhesive in the second adhesive layer 30 and the wallboard panels.

In use, the present joint tape 20 is applied to a joint or corner 36 (FIG. 1A) formed between adjacent wallboard panels 38a and 38b where at least a portion of the joint tape extends onto each of the adjacent wallboard panels. Initially, the second adhesive layer 30 helps to position and secure the joint tape 20 on the wallboard panels 38a, 38b by forming a relatively weak bond with the wallboard panels. The weaker bond between the second adhesive layer 30 and the wallboard panels 38a, 38b enables the present joint tape 20 to be easily removed and repositioned on the wallboard panels to place the joint tape in the correct position over the joint or corner 36 in a short amount of time. Also, the weak bonding ability of the second adhesive layer 30 enables the present joint tape 20 to be wound upon itself in a roll without sticking strongly to itself so that the tape can be readily stored and transported and then be easily and quickly unrolled and used at a job site.

After the joint tape 20 has been secured to adjacent wallboard panels 38a, 38b using the second adhesive layer 30, water is applied to the joint tape to moisten and activate the first adhesive layer 28. The water may be directly applied to the exterior surface of the joint tape 20 that at least partially seeps through the tape and moistens or wets the second adhesive layer 28. More preferably, joint compound 40 (FIG. 1B) is applied to the exterior surface on the front side 24 of the joint tape 20 during the finishing process. In this way, the water in the joint compound 40 wets or moistens the joint tape 20 such that water seeps through the base substrate 22 to wet and activate the first adhesive layer 28. It is important to note that the base substrate 22 is preferably made of a non-swelling paper that does not swell and separate from wallboard when the paper is wetted by water or joint compound. In this way, a majority of the surface of the base substrate 22 remains in contact with the wallboard to enhance the bond between the joint tape and the wallboard.

After the first adhesive layer 28 is activated by water, the bond between the first adhesive layer 28 and the adjacent wallboard panels 38a, 38b strengthens as the joint compound 40 dries or sets. Thus, the weaker bond of the second adhesive layer 30 enables the joint tape 20 to be easily and quickly positioned over a joint or corner 36, and then the first adhesive layer 28 firmly secures the joint tape 20 to the wallboard panels 38a, 38b. Otherwise, the joint tape 20 would have to be quickly moved into position on the wallboard panels 38a, 38b before the second adhesive layer 30 dries or sets, which could lead to the joint tape 20 being in the wrong position on the wallboard panels and also lead to waste of materials and time.

Figure 6:
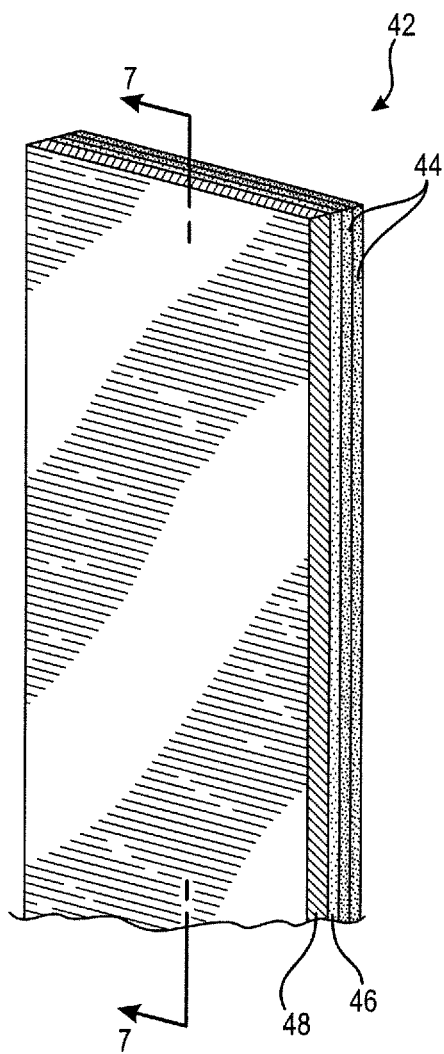
FIG. 6 is a fragmentary perspective view of another embodiment of the present joint tape.
Figure 7:
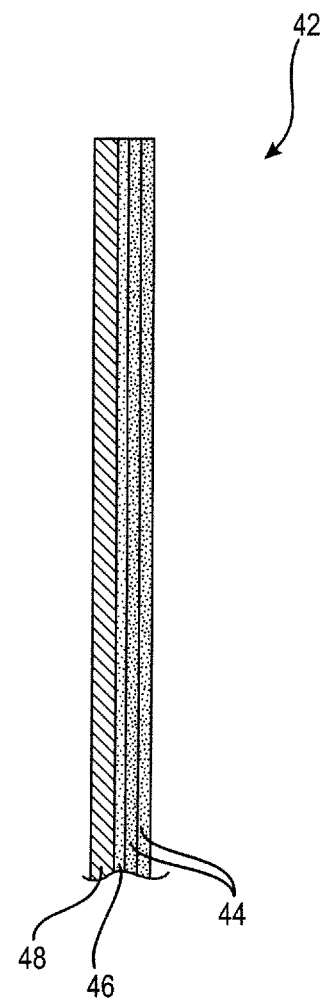
FIG. 7 is a fragmentary cross-sectional view of the joint tape of FIG. 6 taken substantially along line 7-7 and in the direction generally indicated.

Referring now to FIGS. 6 and 7, in another embodiment, the present joint tape 42 includes a plurality of second adhesive layers 44 that are applied to first adhesive layer 46 on a base substrate 48 to further enhance the bond between the joint tape and wallboard panels. In this embodiment, as is the case with the joint tape 20 discussed above, the first adhesive layer 46 includes an adhesive that is different than the adhesive of each of the second adhesive layers 44. As such, each of the second adhesive layers 44 may include the same adhesive or one or more of the second adhesive layers 44 may include different adhesives. Preferably, each of the second adhesive layers 44 includes a remoistenable or wettable adhesive that is activated by contact with water, which is either directly applied to the adhesive or by contact with the water in joint compound used to secure the joint tape to wallboard panels as described above. The wettable adhesive may be any suitable adhesive that is activated through contact with moisture and/or water. Further, similar to the joint tape 20, one or more of the second adhesive layers 44 may be applied to the first adhesive layer 46 in a designated pattern where the pattern may include a plurality of spaced apart circles or a plurality of lines extending across a width of the base substrate. It should be appreciated that the pattern may be any suitable pattern or patterns.

Figure 8:
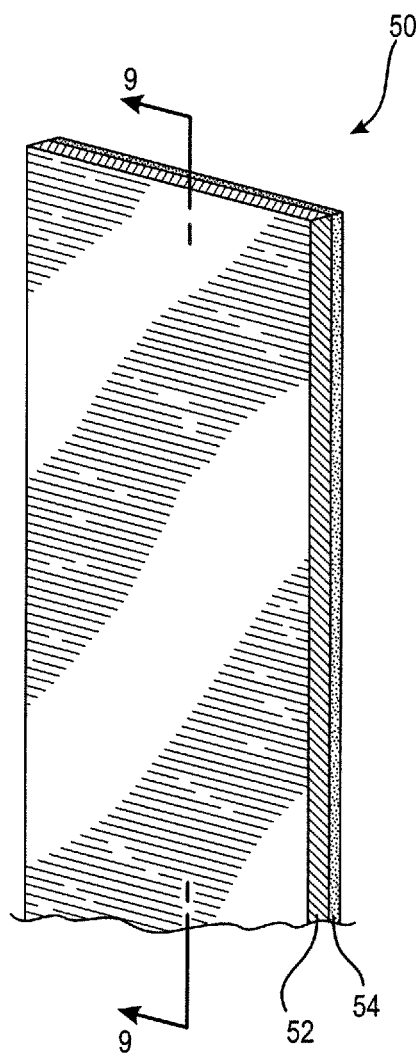
FIG. 8 is a fragmentary perspective view of a further embodiment of the present joint tape.
Figure 9:
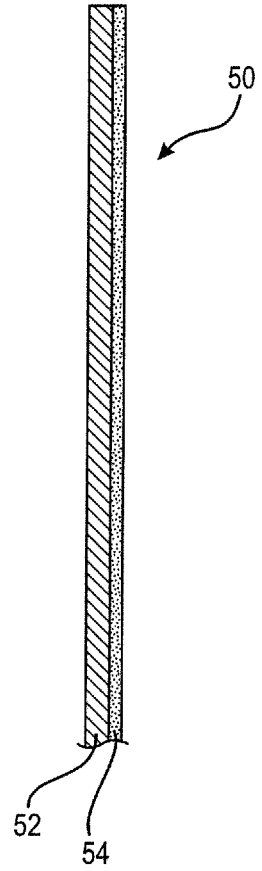
FIG. 9 is a fragmentary cross-sectional view of the joint tape of FIG. 8 taken substantially along line 9-9 and in the direction generally indicated.

Referring now to FIGS. 8 and 9, a further embodiment of the present joint tape is illustrated, in which the joint tape 50 includes a base substrate 52 (as described above), and a single, mixed adhesive layer 54 applied to a surface of the base substrate. More specifically, the adhesive layer 54 is formed by mixing two compatible adhesives such that the adhesive layer has a combination of tackiness or stickiness, similar to the second adhesive layer in the embodiment shown FIGS. 2 and 3, and a water activated adhesive, similar to the first adhesive layer shown in FIGS. 2 and 3. It should be appreciated that the adhesive layer 54 may be formed by mixing two or more compatible adhesives where the adhesives may be mixed in a 1:1 ratio by volume or any other suitable ratio. Further, the adhesives used to form the mixed adhesive layer 54 may be any suitable adhesive.

Two different samples of the joint tape 20 have been tested to determine the bonding strength and durability of the joint tape after being applied to joints and corners of adjacent wallboard panels.

The first sample of the joint tape included a base substrate 22 made with Graham and Brown GB3 paper manufactured by Graham and Brown in Blackburn, United Kingdom, and a single layer of adhesive comprised of a 1:1 ratio (by volume) mixture of Aquence 8403 (pressure sensitive adhesive) and Aquence 2018 (wettable adhesive). The joint tape may be manufactured with a ratio of Aquence 8403 to Aquence 2018 between 0.5 to 1 and 6 to 1. These ratios cause the adhesive on the joint tape to be tacky to the touch and also adhere strongly to wallboard panels after moisture is applied to the joint tape. Furthermore, these ratios do not cause blocking of the joint tape when in a roll, i.e., do not cause the joint tape paper to stick to itself strongly enough that the joint tape cannot be unrolled. It should be appreciated that moisture may be applied to the joint tape by applying water to the adhesive on the joint tape before attaching the joint tape to the wallboard panels, or by covering the joint tape (after being attached to the wallboard panels) with wet joint compound, where the water in the joint compound soaks through and saturates the adhesive in the joint tape.

In an embodiment, the adhesive is composed of 3 parts Aquence 8403 to 1 part Aquence 2018 and is applied at a thickness of 0.0010 to 0.0015 inches wet (20-25 g/1000 square inches). In this embodiment, the thickness of the adhesive when it's dry is about 75% of the thickness of the adhesive when it's wet. It should be appreciated that the adhesive may be made with any suitable ratios and thicknesses of the materials used to form the adhesive.

The second sample of the joint tape 20 included a base substrate 22 made with Ahlstrom BR7199 paper (non-swilling, flax fiber/polyester fiber nonwoven paper) manufactured by Ahlstrom North America, LLC in Alpharetta, Ga., a first adhesive layer 28 including Aquence 2018 and a second adhesive layer 30 including Technomelt 9625, a hot melt applied pressure sensitive adhesive manufactured by Henkel Adhesives, Bridgewater, N.J.

Both joint tape samples were applied to a surface of a wallboard panel (horizontally and adhesive side down) and covered with about one-eighth of an inch (~⅛") of joint compound. The samples were then allowed to stand for fifteen minutes to allow moisture from the joint compound to soak through the joint tape samples and activate the second adhesive layers on those samples. The joint tape samples were then pressed against the wallboard surface using a four inch (4") drywall knife. Next, a thick layer of the joint compound was removed from the surface of each of the samples to the point where the top surface of each joint tape sample was visible.

After the joint compound dried or set under ambient conditions for forty-eight hours, the joint tape samples were peeled off of the respective wallboard surfaces using a spring gauge that measures the resistance to peeling when one end of the tape is pulled at a ninety degree (90°) angle relative to the wallboard surface. The second sample including the Ahlstrom paper adhered strongly enough to tear the face paper of the drywall in some areas at a peel force of 1.5 to 2.0 kg. By comparison, the sample including the Graham and Brown paper and the mixture of adhesives, had an even stronger bond, tearing a greater percentage of the drywall face paper as it was peeled from the wallboard surface at a peel force greater than 2.0 kg. These peel force values can be compared with the normal delamination force of conventional paper tape which is 1.2 to 1.5 kg. When the bond of the joint tape to the joint compound reaches or exceeds the peel force of 1.2 to 1.5 kg, conventional joint tape paper delaminates, and paper fiber is left bonded to the joint compound such that the bond is considered excellent. Thus, both the first and second samples exhibited excellent bonding with the wallboard surface. By comparison, the peel force of a conventional fiberglass mesh drywall tape, such as Saint Gobain FibaTape Fiberglass Drywall Tape, is 0.8 to 1.2 kg.

Furthermore, shear tests were performed in which a module was prepared by saw cutting 3-inch by 8-inch panels of wallboard (⅜-inch thickness) and a joint was created by bringing the long dimensions of the wallboard panels together in an offset manner, i.e., overlapping the wallboard panels by 4 inches. The joint tape was adhered directly to the surfaces of the wallboard panels, and then covered with a layer of joint compound to a total thickness of 0.025 inches. The first layer was allowed to dry, and then covered with a layer of joint compound to a thickness of 0.040 inches. The prepared sample was then mounted in a test fixture in which bars on the fixture rest against the free ends of the offset sample. The test fixture was mounted on an ATS testing unit and compressed at a rate of 0.04 in/min, with a pretension step to 20 lbs. This test places the joint in a mode in which the two wallboard panels are pushed in opposite directions parallel to the joint, producing a shearing force. The results of the tests on the shear samples for conventional fiberglass mesh tape, and the claimed joint tape (applied wet and dry) are summarized in the following table. A result of less than 15 pounds means that the sample joint is too weak to be mounted in the sample fixture without breaking.

| Joint Tape Type | Shear Strength (lbs) |
| --- | --- |
| GB3 Paper Tape with only Aquence 8403 (PSA) Applied | Less than 15 |
| Conventional Fiberglass Mesh Tape | 40 |
| Claimed Joint Tape (Applied Dry) | 48 |
| Claimed Joint Tape (Applied Wet) | 62 |
| Regular Paper Joint Tape Between Layers of Joint Compound | 95 |

As shown in the table, the claimed joint tape was adhered to a wallboard panel in two ways: (1) "Applied Wet" in which water is applied to the adhesive of the joint tape before applying it to the surface of a wallboard panel, and (2) "Applied Dry" in which the joint tape is adhered to the surface of the wallboard panel with the pressure sensitive adhesive, then wet joint compound is applied on top of the joint tape where the saturated joint tape is firmly pressed onto or against the surface of the wallboard panel with a drywall knife. In each case, whether the joint tape is applied wet or applied dry, the shear strength of the joint tape on the wallboard panel was greater than the shear strength of more conventional fiberglass mesh joint tape with 48 to 62 lbs compared to 40 lbs.

It should be noted that in the above testing, no joint compound was applied between the joint tape samples and the wallboard surfaces so that the bond was entirely due to the adhesive layer on the base substrates of the joint tape samples.

In use, the joint tape 50 is applied to a joint or a corner formed between adjacent wallboard panels such that the tackiness of the adhesive layer 54 holds the joint tape on the surfaces of the wallboard so that the joint tape can be properly positioned on the joint or corner. A suitable joint compound is then applied to the joint tape 50. The moisture or water in the applied joint compound at least partially seeps or soaks through the base substrate 52 of the joint tape 50 and contacts the adhesive layer 54 thereby activating the water activated adhesive in the adhesive layer. This causes the joint tape 50 to form a strong bond with the wallboard to secure the joint tape to the wallboard and enable additional joint compound to be applied to the joint or corner, as needed, to finish the joint or corner.

While particular embodiments of the present joint tape with adhesive backing have been shown and described, it will be appreciated by those skilled in the art that changes and modifications may be made thereto without departing from the invention in its broader aspects and as set forth in the following claims.

What is claimed is:

1. A joint tape to be applied to wallboard, the joint tape comprising:
 a base substrate having a first side and an opposing, second side, said base substrate being made of a non-swelling cellulose material, said non-swelling cellulose material including fibers; and
 a single adhesive layer applied to said first side of said base substrate, wherein said adhesive layer is formed by a mixture of at least two adhesives, a first one of said at least two adhesives configured to form a bond with the wallboard, and a second one of said at least two adhesives being a water-activated adhesive that is configured to form a bond with the wallboard,
 wherein said base substrate is at least partially water absorbent to enable water to soak through said base substrate from said second side to said first side and activate said second one of said at least two adhesives,
 wherein the bond formed between the second one of said at least two adhesives and the wallboard is stronger than the bond formed between the first one of said at least two adhesives and the wallboard, and
 wherein a shear strength of the joint tape is 48 to 62 pounds.

2. The joint tape of claim 1, wherein said first one of said at least two adhesives forms a weak bond with the wallboard such that the base substrate is removable and repositionable on the wallboard.

3. The joint tape of claim 1, wherein said adhesive layer is applied to an entire surface of said first side of the base substrate.

4. The joint tape of claim 1, wherein said cellulose material is paper.

5. The joint tape of claim 1, wherein said fibers comprise at least one of polyester fibers, glass fibers and polymer fibers.

* * * * *